US012260872B2

(12) United States Patent
Otsuka et al.

(10) Patent No.: US 12,260,872 B2
(45) Date of Patent: Mar. 25, 2025

(54) SPEECH PROCESSING SYSTEM AND SPEECH PROCESSING METHOD

(71) Applicant: HONDA MOTOR CO., LTD., Tokyo (JP)

(72) Inventors: Kota Otsuka, Tokyo (JP); Shinichi Kikuchi, Tokyo (JP); Yasunari Sato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 550 days.

(21) Appl. No.: 17/668,422

(22) Filed: Feb. 10, 2022

(65) Prior Publication Data

US 2022/0301576 A1 Sep. 22, 2022

(30) Foreign Application Priority Data

Mar. 16, 2021 (JP) ................................ 2021-042296

(51) Int. Cl.
*G10L 21/0232* (2013.01)
*G10L 21/0216* (2013.01)
(Continued)

(52) U.S. Cl.
CPC .......... *G10L 21/0232* (2013.01); *H04R 1/406* (2013.01); *H04R 3/005* (2013.01);
(Continued)

(58) Field of Classification Search
CPC ....... G10L 21/0232; G10L 2021/02166; G10L 21/0208; G10L 21/0216;
(Continued)

(56) References Cited

U.S. PATENT DOCUMENTS 5,404,397 A * 4/1995 Janse ........................ H04R 3/02 381/95
7,609,646 B1 * 10/2009 Qi ........................... H04L 12/66 370/252

(Continued)

FOREIGN PATENT DOCUMENTS

JP 05-224679 9/1993
JP 07-199970 8/1995

(Continued)

OTHER PUBLICATIONS

Japanese Notice of Allowance for Japanese Patent Application No. 2021-042296 mailed Jul. 23, 2024.

*Primary Examiner* — Michael Colucci
(74) *Attorney, Agent, or Firm* — Amin, Turocy & Watson, LLP

(57) ABSTRACT

A speech processing system includes one or more analog microphones each arrangeable within a cabin and configured to output a first analog speech signal, one or more digital microphones each arrangeable within the cabin and configured to output a digital speech signal, a digital-to-analog convertor configured to convert the digital speech signal into a second analog speech signal, and a speech signal processer including a delay processer configured to delay at least the first analog speech signal on the basis of a delay time period when the digital-to-analog convertor converts the digital speech signal, which is collected at the same time point as the first analog speech signal, into the second analog speech signal and output the delayed first analog speech signal as a third analog speech signal and configured to perform speech signal processing on the basis of the second analog speech signal and the third analog speech signal.

6 Claims, 6 Drawing Sheets

(51) Int. Cl.
*H04R 1/40* (2006.01)
*H04R 3/00* (2006.01)

(52) U.S. Cl.
CPC ............... *G10L 2021/02166* (2013.01); *H04R 2201/401* (2013.01); *H04R 2499/13* (2013.01)

(58) Field of Classification Search
CPC .......... G10L 2021/02165; H04R 1/406; H04R 3/005; H04R 2201/401; H04R 2499/13
See application file for complete search history.

(56) References Cited

U.S. PATENT DOCUMENTS

| | | | | |
|---|---|---|---|---|
| 10,140,089 | B1 * | 11/2018 | Paranjpe | G10L 19/0018 |
| 10,219,072 | B1 * | 2/2019 | Sullivan, Jr. | H04R 1/028 |
| 10,650,840 | B1 * | 5/2020 | Solbach | G10L 21/0224 |
| 11,107,488 | B1 * | 8/2021 | Mansour | H04R 1/406 |
| 2001/0016783 | A1 * | 8/2001 | Graumann | H04M 9/08<br>381/56 |
| 2013/0311183 | A1 * | 11/2013 | Onishi | G10L 25/93<br>704/245 |
| 2018/0301137 | A1 * | 10/2018 | Pfaffinger | G10K 11/17823 |
| 2021/0084406 | A1 * | 3/2021 | Fraize, Jr. | H04R 1/1041 |
| 2021/0297770 | A1 * | 9/2021 | Wexler | H04R 3/02 |

FOREIGN PATENT DOCUMENTS

| | | |
|---|---|---|
| JP | 2012-213132 | 11/2012 |
| JP | 5242488 | 7/2013 |
| JP | 2015-149550 | 8/2015 |
| JP | 2018-538558 | 12/2018 |
| WO | 2012/105386 | 8/2012 |

* cited by examiner

SPEECH PROCESSING SYSTEM AND SPEECH PROCESSING METHOD

CROSS-REFERENCE TO RELATED APPLICATION

Priority is claimed on Japanese Patent Application No. 2021-042296, filed Mar. 16, 2021, the content of which is incorporated herein by reference.

BACKGROUND OF THE INVENTION

Field of the Invention

The present invention relates to a speech processing system and a speech processing method.

Description of Related Art

Conventionally, technology related to a vehicle device that receives an operation corresponding to an input speech command has been disclosed (see, for example, Japanese Unexamined Patent Application, First Publication No. 2012-213132). In the conventional technology, the speech command is recognized by a speech recognition means from a user's utterance output by a microphone. Conventional microphones are analog microphones that output an analog speech signal and a digital microphone that outputs a digital speech signal. In recent years, the introduction of a digital microphone as a speech input means in a system mounted in a vehicle has been studied. However, it may be difficult to change all conventional analog microphones to digital microphones, for example, in terms of cost and the like. Therefore, in a vehicle system, it is conceivable to mix an analog microphone and a digital microphone. However, in the conventional technology, a case where the analog microphone can be replaced with the digital microphone has been described, but a case where an analog microphone and a digital microphone are mixed has not been taken into consideration.

In relation to this, for example, Japanese Patent No. 5242488 discloses technology related to a wireless microphone system in which an analog microphone and a digital microphone are mixed. Japanese Patent No. 524248 discloses a case where an analog receiver for an analog microphone and a digital receiver for a digital microphone are provided, a speech signal is transmitted from each microphone via a mixing distributor, and therefore a coaxial cable between the microphone and the receiver can be shared.

However, the technology described in Japanese Patent No. 5242488 is technology related to transmission of a speech signal in a system in which an analog microphone and a digital microphone are mixed, but is not technology related to a system that performs speech processing using each of an analog speech signal output from the analog microphone and a digital speech signal output from the digital microphone. As described above, in the conventional technology, technology for implementing a speech processing system that performs speech processing using each of an analog speech signal and a digital speech signal in a vehicle in which an analog microphone and a digital microphone are mixed is not disclosed.

SUMMARY OF THE INVENTION

The present invention has been made on the basis of the recognition of the above-described problems and an objective of the present invention is to provide a speech processing system and a speech processing method capable of performing speech processing using each of an analog speech signal and a digital speech signal in a vehicle where an analog microphone and a digital microphone are mixed.

A speech processing system and a speech processing method according to the present invention adopt the following configurations.

(1): According to an aspect of the present invention, there is provided a speech processing system including: one or more analog microphones each arrangeable within a cabin and configured to output a first analog speech signal; one or more digital microphones each arrangeable within the cabin and configured to output a digital speech signal; a digital-to-analog convertor configured to convert the digital speech signal into a second analog speech signal; and a speech signal processer including a delay processer configured to delay at least the first analog speech signal on the basis of a delay time period when the digital-to-analog convertor converts the digital speech signal, which is collected at the same time point as the first analog speech signal, into the second analog speech signal and output the delayed first analog speech signal as a third analog speech signal and configured to perform speech signal processing on the basis of the second analog speech signal and the third analog speech signal.

(2): In the above-described aspect (1), the speech signal processer performs the speech signal processing of causing an audio device arranged within the cabin to pronounce a speech output signal for canceling noise within the cabin on the basis of the second analog speech signal and the third analog speech signal.

(3): In the above-described aspect (1) or (2), the speech signal processer further includes a speech corrector configured to correct the first analog speech signal or the second analog speech signal using a correction value based on information of arrangement positions of the analog microphone and the digital microphone within the cabin or information of the distance between the arrangement positions within the cabin, and the speech corrector outputs a simulated speech signal obtained by correcting the second analog speech signal using the correction value as the third analog speech signal when an abnormality has occurred in the analog microphone.

(4): In any one of the above-described aspects (1) to (3), the speech signal processer further includes a speech corrector configured to correct the first analog speech signal or the second analog speech signal using a correction value based on information of arrangement positions of the analog microphone and the digital microphone within the cabin or information of the distance between the arrangement positions within the cabin, and the speech corrector outputs a simulated speech signal obtained by correcting the first analog speech signal using the correction value as the second analog speech signal when an abnormality has occurred in the digital microphone.

(5): In the above-described aspect (3) or (4), the speech signal processer: forms bidirectionality in which the analog microphone and the digital microphone are directed toward a driver's seat and a passenger seat within the cabin; and switches directionality to unidirectionality in which the other of the analog microphone and the digital microphone in which an abnormality has not occurred is directed toward the driver's seat when an abnormality has occurred in one of the analog microphone and the digital microphone.

(6): According to an aspect of the present invention, there is provided a speech processing method including: delaying, by a computer, at least a first analog speech signal output by each of one or more analog microphones arrangeable within a cabin on the basis of a delay time period when the digital-to-analog convertor converts a digital speech signal, which is collected at the same time point as the first analog speech signal and output by each of one or more digital microphones arrangeable within the cabin, into a second analog speech signal and outputting the delayed first analog speech signal as a third analog speech signal; and performing, by the computer, speech signal processing on the basis of the second analog speech signal and the third analog speech signal.

According to the above-described aspects (1) to (6), it is possible to perform speech processing using each of an analog speech signal and a digital speech signal in a vehicle where an analog microphone and a digital microphone are mixed.

DETAILED DESCRIPTION OF THE INVENTION

Hereinafter, embodiments of a speech processing system and a speech processing method of the present invention will be described with reference to the drawings. As used throughout this disclosure, the singular forms "a," "an," and "the" include plural reference unless the context clearly dictates otherwise.

[Configuration of Speech Processing System]

Figure 1:
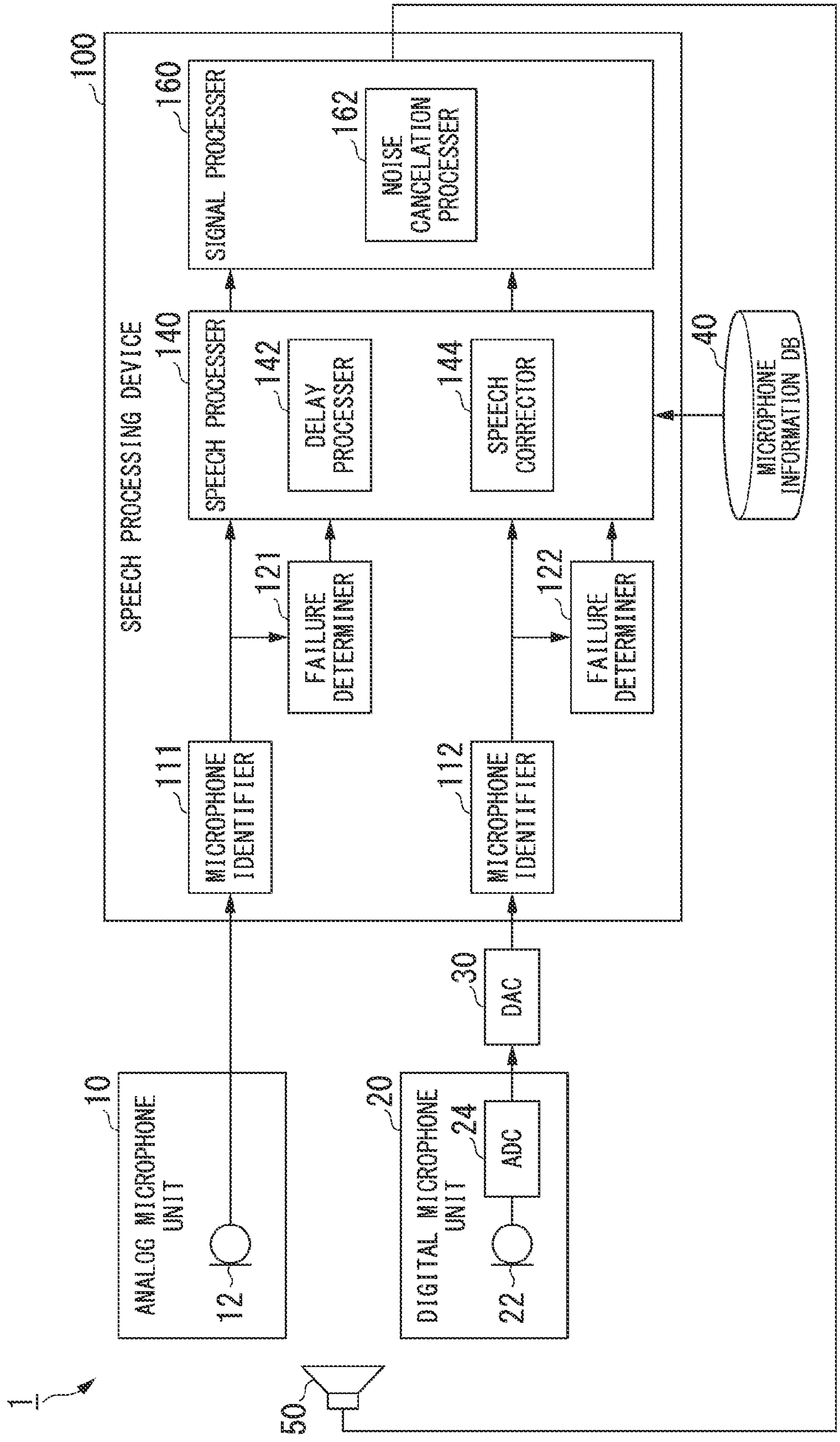
FIG. 1 is a schematic configuration diagram of a speech processing system according to an embodiment.

FIG. 1 is a schematic configuration diagram of a speech processing system according to an embodiment. A vehicle equipped with the speech processing system is, for example, a four-wheeled vehicle, and a drive source thereof is an internal combustion engine such as a diesel engine or a gasoline engine, an electric motor, or a combination thereof. The electric motor operates using electric power generated by the generator connected to the internal combustion engine or electric power when a secondary battery or a fuel cell is discharged.

In FIG. 1, a speaker 50 is shown as a component related to a speech processing system 1 among components provided in the vehicle (hereinafter referred to as a "vehicle M") in which the speech processing system 1 is mounted. The speaker 50 causes a speech signal output by a speech processing device 100 to be pronounced within a cabin of the vehicle M. The speaker 50 may also be used as a speaker arranged for playing music within the cabin or may be arranged within the cabin as a dedicated speaker in the speech processing system 1. The speaker 50 is an example of an "audio device" in the claims.

The speech processing system 1 includes, for example, an analog microphone unit 10, a digital microphone unit 20, a digital-to-analog convertor (DAC) 30, a speech processing device 100, and a microphone information database (DB) 40.

The analog microphone unit 10 includes, for example, one or more microphone bodies 12 arranged at positions different from each other within the cabin. The microphone body 12 collects ambient speech at a position where it is arranged within the cabin. The speech collected by the microphone body 12 includes noise within the cabin (for example, music played within the cabin, noise outside of the cabin that has leaked into the cabin, and the like) as well as speech uttered by an occupant of the vehicle M. The analog microphone unit 10 outputs an analog speech signal according to the speech collected by each microphone body 12 to the speech processing device 100. The analog microphone unit 10 or the microphone body 12 is an example of an "analog microphone" in the claims and the analog speech signal output by the analog microphone unit 10 to the speech processing device 100 is an example of a "first analog speech signal" in the claims.

The digital microphone unit 20 includes, for example, one or more microphone bodies 22 arranged at positions different from each other within the cabin and an analog-to-digital convertor (ADC) 24. The microphone body 22 collects ambient speech at a position where it is arranged within the cabin. The microphone body 22 may be similar to the microphone body 12 provided in the analog microphone unit 10. The speech collected by the microphone body 22 includes the noise within the cabin as well as the speech uttered by the occupant of the vehicle M. The ADC 24 converts an analog speech signal collected and output by the corresponding microphone body 22 into a digital speech signal. The digital microphone unit 20 outputs the digital speech signal obtained in a conversion process of the ADC 24 after collection by each microphone body 22 to the DAC 30. A configuration of the digital microphone unit 20 or the microphone body 22 and the ADC 24 is an example of a "digital microphone" in the claims.

The DAC 30 converts the digital speech signal output by the digital microphone unit 20 back into an analog speech signal. That is, the DAC 30 returns the digital speech signal to the analog speech signal collected by the microphone body 22. The DAC 30 outputs the analog speech signal after the conversion to the speech processing device 100. The analog speech signal output by the DAC 30 to the speech processing device 100 is an example of a "second analog speech signal" in the claims.

The speech processing device 100 performs speech signal processing on the basis of the analog speech signal output by the analog microphone unit 10 (hereinafter referred to as an "analog-microphone speech signal") and the analog speech signal output by the DAC 30 (hereinafter referred to as a "digital-microphone speech signal"). The speech processing device 100 includes, for example, a microphone identifier 111, a microphone identifier 112, a failure determiner 121, a failure determiner 122, a speech processer 140, and a signal processer 160. The speech processer 140 includes, for example, a delay processer 142 and a speech corrector 144. The signal processer 160 includes, for example, a noise cancelation processer 162. These components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by a dedicated LSI circuit. Some or all of these components may be implemented by, for example, a hardware processor such as a central processing unit (CPU) executing a program (software) or may be implemented by software and hardware in cooperation. The program may be pre-stored in a storage device (a storage device including a non-transitory storage medium) such as a hard disk drive (HDD) or a flash memory provided in the vehicle M or may be stored in a removable storage medium (a non-transitory storage medium) such as a DVD or a CD-ROM and installed in the HDD or the flash memory provided in the vehicle M when the storage medium is mounted in a drive device provided in the vehicle M. The speech processing device 100 is an example of a "speech signal processer" in the claims. An analog-microphone speech signal is also an example of the "first analog speech signal" in the claims and a digital-microphone speech signal is also an example of the "second analog speech signal" in the claims.

The microphone identifier 111 identifies the microphone body 12 arranged at each position within the cabin and outputs the analog-microphone speech signal collected and output by each microphone body 12 to the speech processer 140 and the failure determiner 121.

The microphone identifier 112 identifies the microphone body 22 arranged at each position within the cabin on the basis of the digital-microphone speech signal output by the DAC 30 and outputs the digital-microphone speech signal corresponding to the analog speech signal collected and output by each microphone body 22 to the speech processer 140 and the failure determiner 121. The microphone identifier 112 may be similar to the microphone identifier 111. The microphone identifier 111 and the microphone identifier 112 may be configured as one component.

The failure determiner 121 determines whether or not an abnormality has occurred in each microphone body 12 on the basis of the analog-microphone speech signal output by the microphone identifier 111. When it is determined that an abnormality has occurred in any microphone body 12, the failure determiner 121 outputs a notification signal for providing a notification of the microphone body 12 in which it is determined that the abnormality has occurred to the speech processer 140.

The failure determiner 122 determines whether or not an abnormality has occurred in each microphone body 22 (including the ADC 24) on the basis of the digital-microphone speech signal output by the microphone identifier 112. When the failure determiner 122 determines that an abnormality has occurred in any microphone body 22, the failure determiner 122 outputs a notification signal for providing a notification of the microphone body 22 in which it is determined that an abnormality has occurred to the speech processer 140. The failure determiner 122 may be similar to the failure determiner 121. The failure determiner 121 and the failure determiner 122 may be configured as a single component.

The delay processer 142 delays an input speech signal by a prescribed time period on the basis of delay time information (to be described below) stored in the microphone information DB 40. More specifically, the delay processer 142 delays the analog-microphone speech signal output by the microphone identifier 111 by a delay time period of the digital-microphone speech signal. The delay time period of the digital-microphone speech signal occurs because no other component is connected on a path along which the analog-microphone speech signal is transmitted, whereas the ADC 24 or the DAC 30 is connected on a path along which the analog-microphone speech signal is transmitted. That is, for example, even if the microphone body 12 and the microphone body 22 have collected the speech at the same time point, the analog-microphone speech signal is transmitted as it is, whereas the digital-microphone speech signal is delayed by at least a time period required for a conversion process of the DAC 30 until the digital-microphone speech signal is input to the speech processing device 100 because an analog-to-digital conversion process of the ADC 24 or a digital-to-analog conversion process of the DAC 30 is performed until the digital-microphone speech signal is transmitted. Thus, the delay processer 142 delays the analog-microphone speech signal so that a time difference in the transmission between the analog-microphone speech signal and the digital-microphone speech signal based on the speech collected at the same time point is eliminated. The delay processer 142 outputs the delayed analog-microphone speech signal (hereinafter referred to as a "delayed speech signal") to the signal processer 160. The delayed speech signal obtained by delaying the analog-microphone speech signal in the delay processer 142 is an example of a "third analog speech signal" in the claims.

The speech corrector 144 corrects an input speech signal on the basis of correction value information (to be described below) stored in the microphone information DB 40. More specifically, when the analog-microphone speech signal has been input, the speech corrector 144 corrects the input analog-microphone speech signal and generates a simulated speech signal by simulating a digital-microphone speech signal from the corrected analog-microphone speech signal. On the other hand, when the digital-microphone speech signal has been input, the speech corrector 144 corrects the input digital-microphone speech signal and generates a simulated speech signal by simulating an analog-microphone speech signal from the corrected digital-microphone speech signal.

The noise cancelation processer 162 performs speech signal processing for canceling noise within the cabin, such as noise outside of the cabin that has leaked into the cabin, on the basis of an input speech signal. More specifically, the noise cancelation processer 162 performs a so-called active noise control process of generating a speech signal (hereinafter referred to as a "noise canceling speech signal") having a phase opposite to that of the noise within the cabin included in each speech signal on the basis of the delayed speech signal and the digital-microphone speech signal input from the speech processer 140 (one of these speech signals may be a simulated speech signal). The noise cancelation processer 162 causes the speaker 50 to pronounce the generated noise canceling speech signal. Thereby, the noise within the cabin is canceled by the noise canceling speech signal pronounced by the speaker 50. The noise canceling speech signal is an example of a "speech output signal" in the claims.

The microphone information DB 40 stores various types of information for use in a process in the speech processing device 100. The microphone information DB 40 stores, for example, a delay time period by which the delay processer 142 delays the analog-microphone speech signal, i.e., delay time information related to a time difference in transmission between the analog-microphone speech signal and the digital-microphone speech signal. The time difference in the transmission between the analog-microphone speech signal and the digital-microphone speech signal includes a delay time period (hereinafter referred to as an "audio delay time period") due to the size or shape of the cabin or a cabin space, i.e., an audio space, such as a position where the microphone body 12 and the microphone body 22 are arranged or a position where the speaker 50 is arranged as well as a time period required for the conversion process of the ADC 24 or the DAC 30 described above. The audio delay time period can be obtained in advance for each microphone body according to calculation based on, for example, simulation using design data of the vehicle M (so-called computer-aided design (CAD) data), measurement when speech is actually generated in the actual vehicle that is the vehicle M, positions where the microphone body 12 and the microphone body 22 are arranged within the cabin, a distance between the positions, and the like. Further, the time difference in the transmission between the analog-microphone speech signal and the digital-microphone speech signal includes a delay time period (hereinafter referred to as a "system delay time period") due to characteristics of a harness (a cable) along which each of the analog-microphone speech signal and the digital-microphone speech signal is transmitted to the speech processing device 100, routing of the harness, a time period required for signal processing on each speech signal, or the like in addition to the conversion time in the ADC 24 and the DAC 30 described above. The system delay time period can be uniquely obtained in advance for each microphone body on the basis of a configuration and specifications of the speech processing system 1 such as a connection relationship between components provided in the speech processing system 1 and a processing time period in each component. The microphone information DB 40 stores information about the audio delay time period and the system delay time period obtained in advance. The microphone information DB 40 may separately store the audio delay time period and the system delay time period or may store a total delay time of the audio delay time period and the system delay time period. The delay time information stored in the microphone information DB 40 may be stored in, for example, a storage provided in the speech processer 140 or the delay processer 142.

The microphone information DB 40 stores, for example, correction value information about a correction value for the speech corrector 144 to generate a simulated signal by simulating the analog-microphone speech signal or the digital-microphone speech signal. The correction value for the speech corrector 144 to generate the simulated signal by simulating the analog-microphone speech signal or the digital-microphone speech signal includes, for example, a correction value for correcting (adjusting) a level difference between the analog-microphone speech signal and the digital-microphone speech signal, a difference in frequency characteristics, a difference in phase characteristics, or the like. The correction value for the speech corrector 144 to generate the simulated signal by simulating the analog-microphone speech signal or the digital-microphone speech signal can be obtained in advance for each microphone body on the basis of a method or information used when the audio delay time period or the system delay time period is obtained. The correction value information stored in the microphone information DB 40 may be stored in, for example, a storage provided in the speech processer 140 or the speech corrector 144.

According to the above-described configuration, the speech processing device 100 causes the speaker 50 to pronounce a noise canceling speech signal for canceling the noise within the cabin at the position where each microphone body is arranged on the basis of a speech signal based on speech collected by the microphone bodies 12 and 22 arranged at positions within the cabin of the vehicle M.

[Speech Signal Used for Speech Signal Processing in Speech Processing System]

Figure 2:
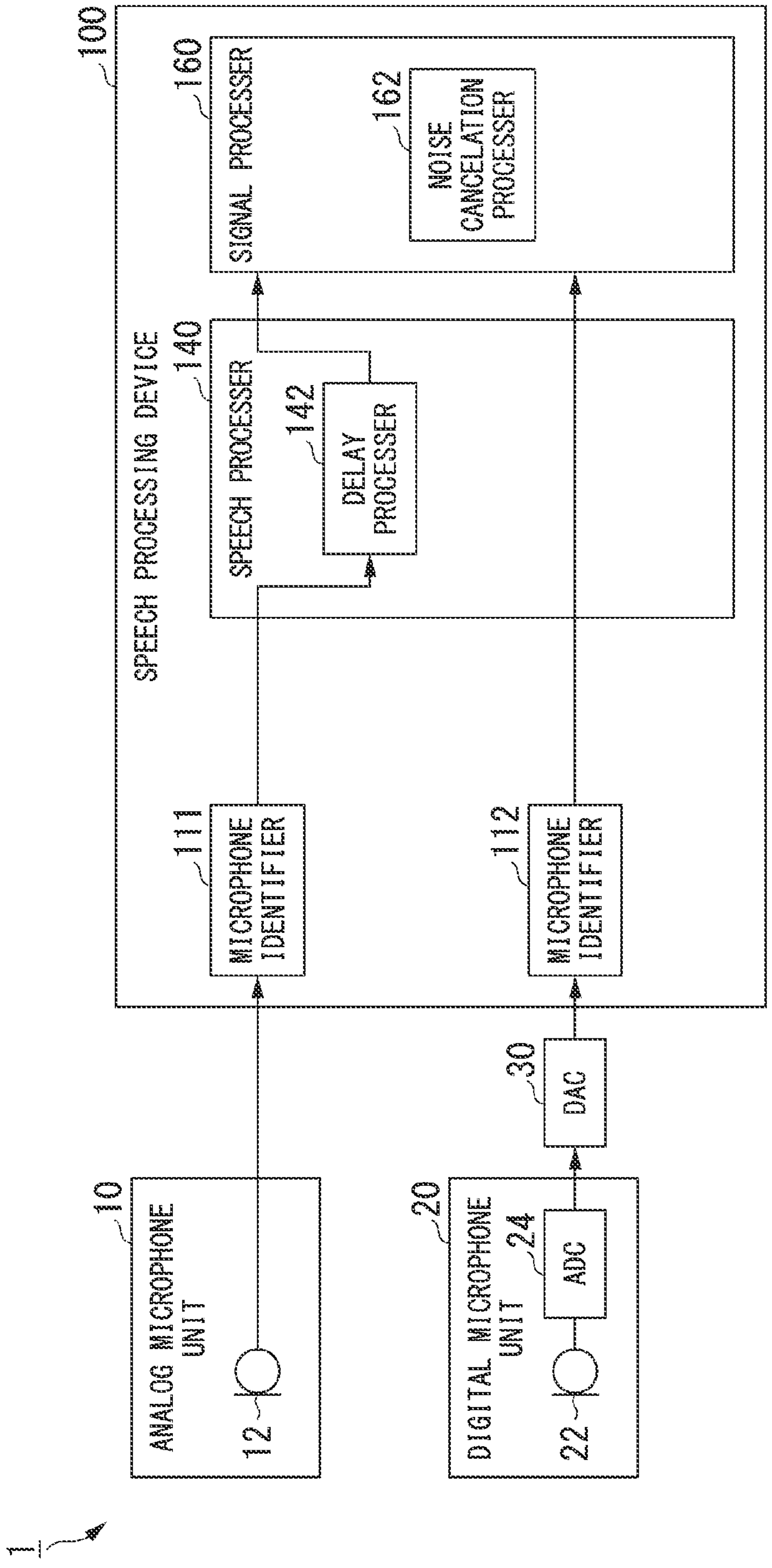
FIG. 2 is a diagram showing an example of a speech signal path.
Figure 3:
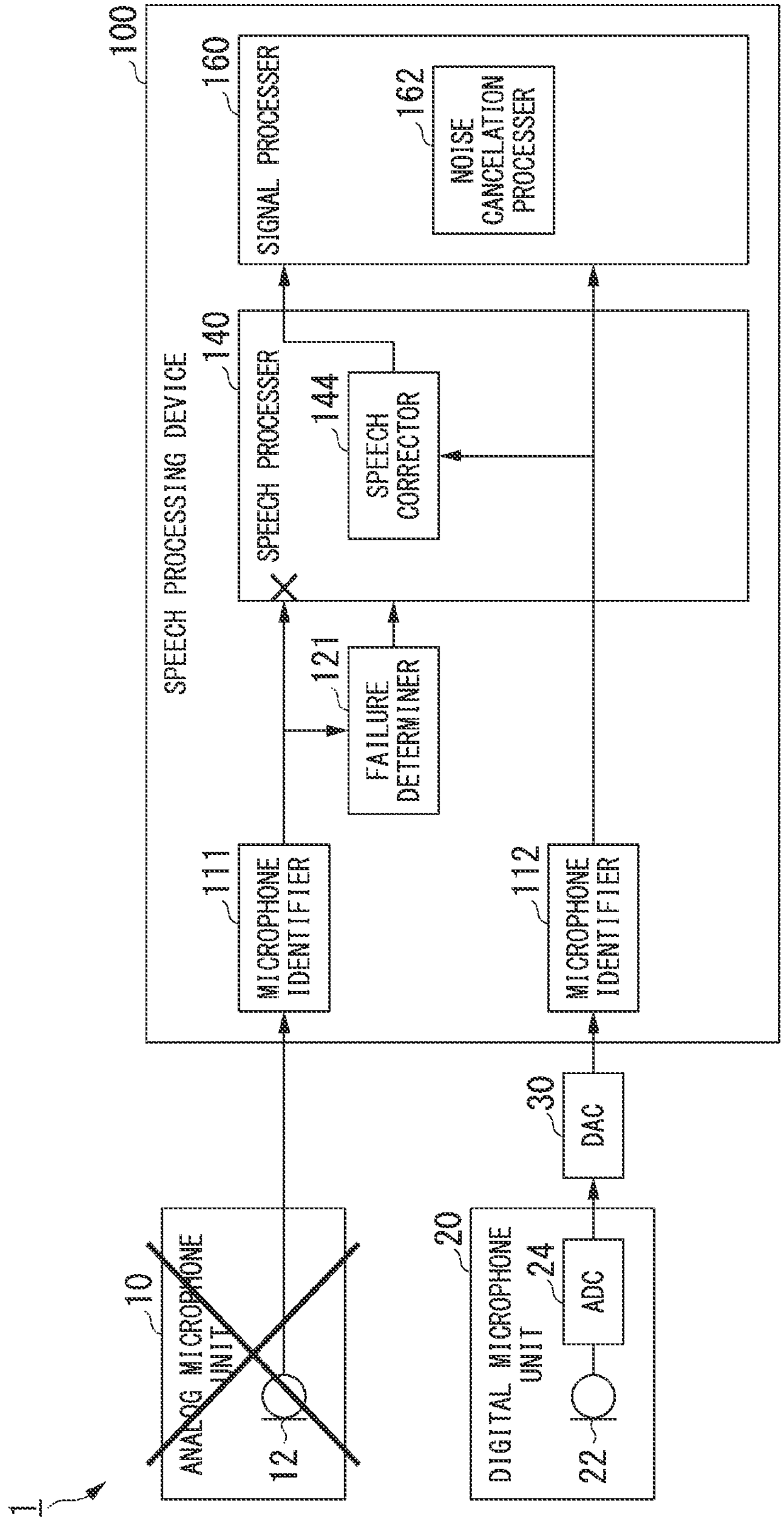
FIG. 3 is a diagram (part 1) showing another example of the speech signal path.
Figure 4:
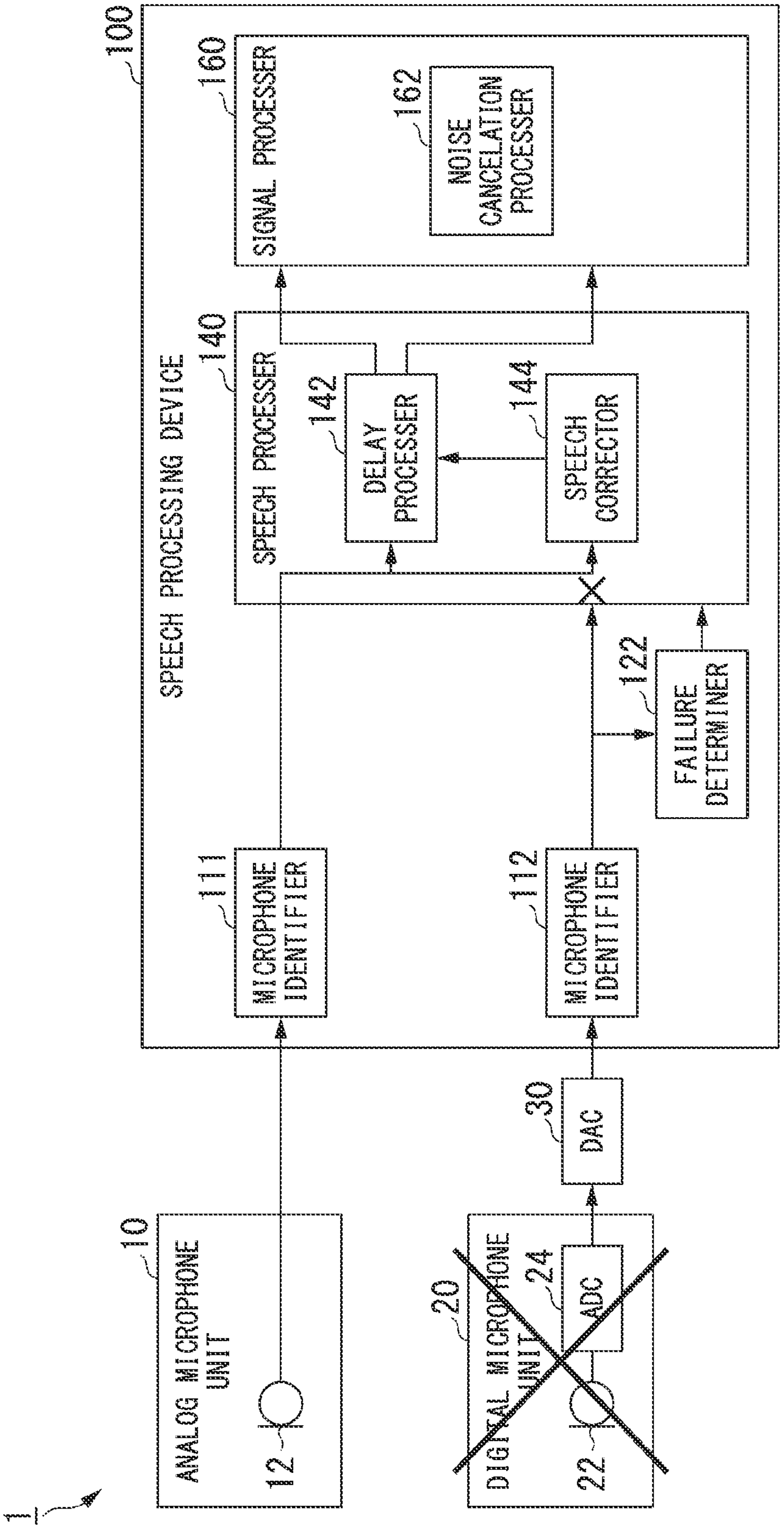
FIG. 4 is a diagram (part 2) showing another example of the speech signal path.

Here, the speech signal used when the noise cancelation processer 162 generates a noise canceling speech signal in accordance with states of the microphone body 12 and the microphone body 22 will be described. FIGS. 2 to 4 are diagrams showing an example of a speech signal path. In FIGS. 2 to 4, a path including components related to an analog-microphone speech signal from the analog microphone unit 10 and a digital-microphone speech signal from the digital microphone unit 20 until they are input to the noise cancelation processer 162 is shown. In FIG. 2, paths of speech signals in a normal operating state (a state in which no abnormality has occurred in each of the microphone body 12 and the microphone body 22) in the speech processing system 1 are shown. In FIG. 3, a path of each speech signal when it is determined that an abnormality has occurred in the microphone body 12 in the speech processing system 1 is shown. In FIG. 4, a path of each speech signal when it is determined that an abnormality has occurred in the microphone body 22 (including the ADC 24) in the speech processing system 1 is shown.

First, the path of each speech signal in the normal operating state will be described with reference to FIG. 2. When no abnormality has occurred in each of the microphone body 12 and the microphone body 22, the speech processer 140 outputs the digital-microphone speech signal input from the digital microphone unit 20 via the microphone identifier 112 to the signal processer 160 as it is. On the other hand, in the speech processer 140, the delay processer 142 delays the analog-microphone speech signal input from the analog microphone unit 10 via the microphone identifier 111 by the delay time period of the digital-microphone speech signal. The speech processer 140 outputs the delayed speech signal delayed by the delay processer 142 to the signal processer 160. Thereby, the noise cancelation processer 162 provided in the signal processer 160 generates a noise canceling speech signal on the basis of the digital-microphone speech signal output by the speech processer 140 and the delayed speech signal based on the analog-microphone speech signal.

In this way, the speech processing device 100 outputs each speech signal to the noise cancelation processer 162 in a state in which a time difference between the delayed speech signal based on the analog-microphone speech signal and the digital-microphone speech signal based on the speech collected at the same time point is eliminated. Thereby, the noise cancelation processer 162 can generate a noise canceling speech signal for canceling the noise within a cabin with higher accuracy.

Next, the path of each speech signal when it is determined that an abnormality has occurred in the microphone body 12 will be described with reference to FIG. 3. When the failure determiner 121 determines that an abnormality has occurred in the microphone body 12 on the basis of the analog-microphone speech signal input from the analog microphone unit 10 via the microphone identifier 111, the failure determiner 121 notifies the speech processer 140 that an abnormality has occurred in the microphone body 12. In this case, as in the normal operating state, the speech processer 140 outputs the digital-microphone speech signal input from the digital microphone unit 20 via the microphone identifier 112 to the signal processer 160 as it is. On the other hand, the speech processer 140 prevents the analog-microphone speech signal input from the analog microphone unit 10 via the microphone identifier 111 from being output to the signal processer 160. Instead, in the speech processer 140, the speech corrector 144 generates a simulated speech signal by simulating an analog-microphone speech signal from the digital-microphone speech signal output to the signal processer 160. The speech processer 140 outputs the simulated speech signal generated by the speech corrector 144 to the signal processer 160 as a delayed speech signal based on the analog-microphone speech signal. Thereby, the noise cancelation processer 162 provided in the signal processer 160 generates a noise canceling speech signal on the basis of the digital-microphone speech signal output by the speech processer 140 and the delayed speech signal (that is actually a simulated speech signal) based on the analog-microphone speech signal as in the normal operating state.

In this way, when it is determined that an abnormality has occurred in the microphone body 12, the speech processing device 100 outputs the simulated speech signal obtained by simulating the analog-microphone speech signal from the digital-microphone speech signal and the digital-microphone speech signal to the noise cancelation processer 162. Thereby, the noise cancelation processer 162 can generate a noise canceling speech signal for canceling the noise within the cabin even if an abnormality has occurred in the microphone body 12.

At this time, in the speech processer 140, the delay processer 142 does not delay the simulated speech signal. This is because the digital-microphone speech signal used to generate the simulated speech signal is a speech signal that already includes a delay, i.e., there is no time difference between the digital-microphone speech signal and the simulated speech signal. However, when the speech corrector 144 requires a time period in a process of generating the simulated speech signal, the delay processer 142 in the speech processer 140 may be configured to delay the digital-microphone speech signal by a time period required for a process of the speech corrector 144 and output the delayed digital-microphone speech to the signal processer 160.

Next, the path of each speech signal when it is determined that an abnormality has occurred in the microphone body 22 will be described with reference to FIG. 4. When the failure determiner 122 determines that an abnormality has occurred in the microphone body 22 on the basis of the digital-microphone speech signal input from the digital microphone unit 20 via the microphone identifier 112, the failure determiner 122 notifies the speech processer 140 that an abnormality has occurred in the microphone body 22. In this case, in the speech processer 140, the delay processer 142 outputs a delayed speech signal obtained by delaying the analog-microphone speech signal input from the analog microphone unit 10 via the microphone identifier 111 to the signal processer 160 as in the normal operation state. On the other hand, the speech processer 140 prevents the digital-microphone speech signal input from the digital microphone unit 20 via the microphone identifier 112 from being output to the signal processer 160. Instead, in the speech processer 140, the speech corrector 144 generates a simulated speech signal by simulating a digital-microphone speech signal from the analog-microphone speech signal input via the microphone identifier 111. Further, in the speech processer 140, the delay processer 142 delays the simulated speech signal generated by the speech corrector 144 by the delay time period in the original digital-microphone speech signal. The speech processer 140 outputs the delayed speech signal delayed by the delay processer 142 as the digital-microphone speech signal to the signal processer 160. Thereby, the noise cancelation processer 162 provided in the signal processer 160 generates a noise canceling speech signal on the basis of the digital-microphone speech signal (i.e., a delayed speech signal obtained by actually delaying a simulated speech signal) and the delayed speech signal based on the analog-microphone speech signal output by the speech processer 140 as in the normal operating state.

In this way, when it is determined that an abnormality has occurred in the microphone body 22, the speech processing device 100 simulates the digital-microphone speech signal from the analog-microphone speech signal and outputs a delayed speech signal that has been further delayed and a delayed speech signal obtained by delaying the analog-microphone speech signal to the noise cancelation processer 162. Thereby, the noise cancelation processer 162 can generate a noise canceling speech signal for canceling the noise within the cabin even if an abnormality has occurred in the microphone body 22.

At this time, there is no time difference between the simulated speech signal generated by the speech corrector 144 and the analog-microphone speech signal that is the source of the simulated speech signal. Thus, it is considered that the delay processer 142 in the speech processer 140 does not need to delay the analog-microphone speech signal. However, the noise cancelation processer 162 performs speech signal processing for generating a noise canceling speech signal at a timing according to the digital-microphone speech signal. Thus, in the speech processer 140, the delay processer 142 outputs the delayed speech signal obtained by delaying the analog-microphone speech signal to the signal processer 160 so that the timing of the speech signal processing in the noise cancelation processer 162 is not changed. Accordingly, in the speech processer 140, the delay processer 142 also delays the simulated speech signal generated by the speech corrector 144 and outputs the delayed simulated speech signal to the signal processer 160. In the above description, the case where the delay processer 142 in the speech processer 140 delays the simulated speech signal by the delay time period in the original digital-microphone speech signal has been described. However, when the speech corrector 144 requires a time period in the process of generating the simulated speech signal, the delay processer 142 in the speech processer 140 may be configured to delay the simulated speech signal by a time period obtained by subtracting a processing time period required by the speech corrector 144 from the delay time period in the original digital microphone signal, i.e., by reducing the amount of delay, and output the delayed simulated speech signal to the signal processer 160.

In this way, even if the speech processing device 100 determines that an abnormality has occurred in any microphone body, the speech processer 140 simulates the speech signal originally output by the microphone body in which the abnormality has occurred and therefore the noise cancelation processer 162 can generate a noise canceling speech signal according to speech signal processing similar to that in the normal operating state. That is, in the speech processing device 100, it is not necessary to change the speech signal processing in the noise cancelation processer 162 when it is determined that an abnormality has occurred in any microphone body. Moreover, in the speech processing device 100, each of the delay processer 142 and the speech corrector 144 generates a corresponding speech signal on the basis of information (delay time information or correction value information) stored in the microphone information DB 40. Therefore, for example, even if the speech processing system 1 is mounted in a different vehicle or the arrangement of the microphone body 12 and the microphone body 22 is changed in the vehicle M, it is not necessary to change the component itself provided in the speech processing system 1 if the delay time information and the correction value information stored in the microphone information DB 40 are changed to information consistent with a connection relationship of each vehicle or component. In other words, the speech processing system 1 is compatible with various vehicles in a configuration that is the same as the above-described configuration.

[Example of Arrangement of Components of Speech Processing System]

Figure 5:
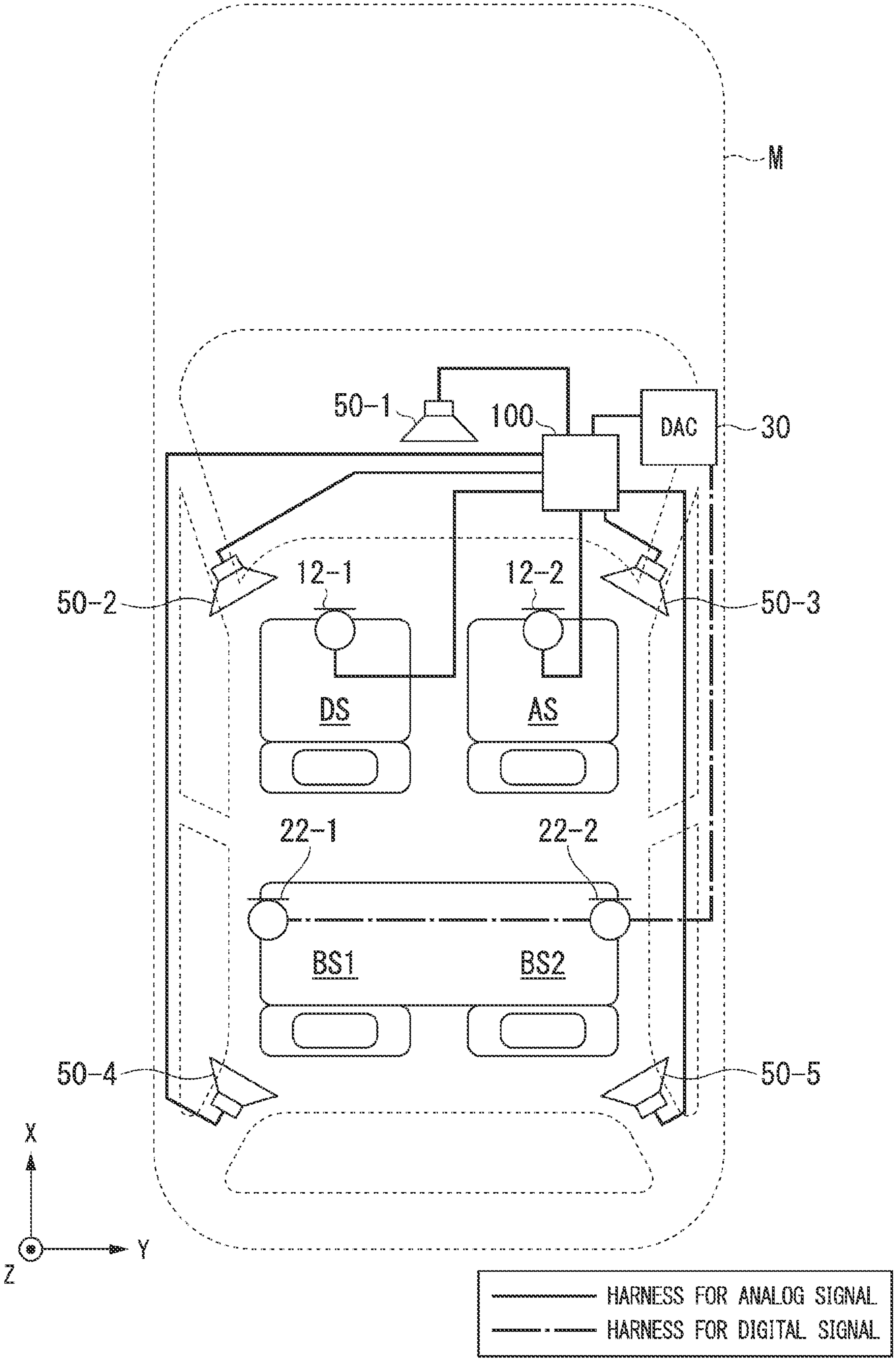
FIG. 5 is a diagram showing an example of an arrangement of components provided in the speech processing system in a vehicle.

Here, an example of an arrangement of microphone bodies in the cabin of the vehicle M will be described. FIG. 5 is a diagram showing an example of an arrangement of components provided in the speech processing system 1 in the vehicle M. In FIG. 5, an example in which the microphone body 12 is arranged at each of the driver's seat DS and a passenger seat AS of the vehicle M and the two microphone bodies 22 are arranged at rear seats BS is shown. More specifically, in the example shown in FIG. 5, a microphone body 12-1 is arranged under the driver's seat DS, a microphone body 12-2 is arranged under the passenger seat AS, the microphone body 22-1 is arranged under a left rear seat BS1, and the microphone body 22-2 is arranged under a right rear seat BS2. In the example shown in FIG. 5, the DAC 30 and the speech processing device 100 are arranged, for example, inside of a dashboard or an instrument panel, and a speaker 50-1 is arranged, for example, within a center console near the center in a vehicle width direction of the vehicle M (a Y-direction in FIG. 5) or at the top of the dashboard. Further, in the example shown in FIG. 5, a speaker 50-2 is arranged, for example, near a front pillar (A pillar) in front of the driver's seat DS side, a speaker 50-3 is arranged, for example, near a front pillar in front of the passenger seat AS side, a speaker 50-4 is arranged near a rear pillar (a C pillar) behind the left rear seat BS1 side, and a speaker 50-5 is arranged near a rear pillar behind the right rear seat BS2 side. In the example shown in FIG. 5, each component is connected by a corresponding harness. More specifically, each microphone body 12 and the DAC 30 are connected by a harness for a digital signal and the speech processing device 100, each microphone body 12, the DAC 30, and each speaker 50 are connected by the harness for the corresponding analog signal.

When the microphone body 12 and the microphone body 22 have been arranged as in the example shown in FIG. 5, the speech processing device 100 can generate a noise canceling speech signal corresponding to a position where each microphone body is arranged on the basis of each analog speech signal and each digital-microphone speech signal. The speech processing device 100 can output a corresponding noise canceling speech signal to the speaker 50 present at each position and cause the speaker 50 to pronounce the corresponding noise canceling speech signal, thereby canceling noise within the cabin at the position.

The arrangement of the microphone body 12 and the microphone body 22 in the vehicle M is not limited to the arrangement of the example shown in FIG. 5. For example, one or both of the microphone bodies 12 in the example shown in FIG. 5 may be replaced with the microphone bodies 22 and one or both of the microphone bodies 22 may be replaced with the microphone bodies 12. Also, the arrangement of the speakers 50 in the vehicle M is not limited to the arrangement of the example shown in FIG. 5.

[Directionality of Microphone in Speech Processing System]

Incidentally, when there is one microphone body 12 or 22, one microphone body does not have directionality and collects ambient speech in an omnidirectional manner. On the other hand, when a plurality of microphone bodies 12 or 22 have been arranged as in the example shown in FIG. 5, for example, it is possible to form bidirectionality for giving directionality to ambient speech to be collected by the two microphone bodies 12 of the microphone body 12-1 and the microphone body 12-2 arranged at the driver's seat DS and the passenger seat AS arranged in the vehicle width direction (a Y-direction in FIG. 5) of the vehicle M. For this reason, in the speech processing system 1, when it is determined that an abnormality has occurred in any microphone body, for example, the microphone body in which the abnormality has not occurred can form unidirectionality for giving directionality to the driver's seat DS.

Figure 6:
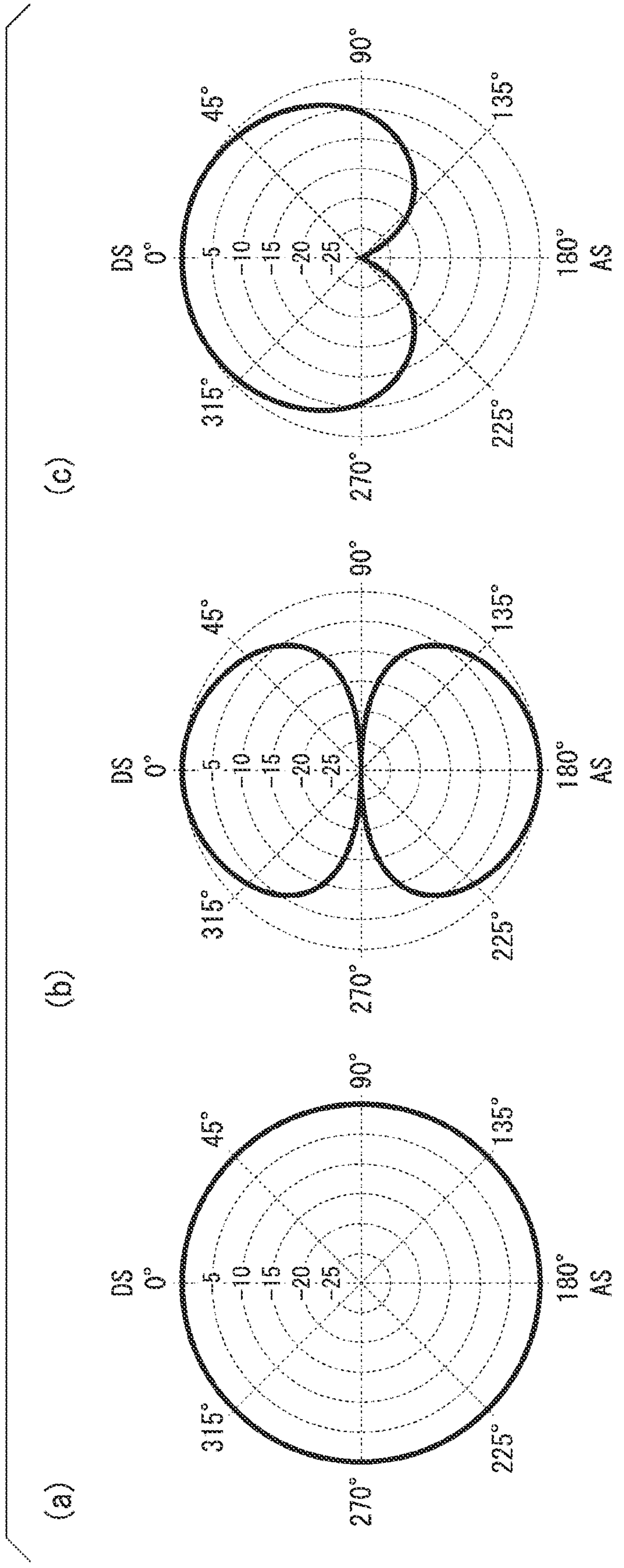
FIG. 6 is a diagram illustrating an example of directionality formed in the speech processing system.

FIG. 6 is a diagram for describing an example of directionality formed in the speech processing system 1. In FIG. 6, an example of directionality formed on the driver's seat DS side and the passenger seat AS side by the microphone body 12-1 and the microphone body 12-2 is shown. In FIG. 6, the direction of 0° is the driver's seat DS side and the direction of 180° is the passenger seat AS side. In (a) of FIG. 6, an example of omnidirectionality formed by one microphone body 12 is shown. In (b) of FIG. 6, an example of bidirectionality formed by two microphone bodies 12 is shown. In (c) of FIG. 6, an example of unidirectionality formed by the microphone body 12 in which no abnormality has occurred when it is determined that an abnormality has occurred in one microphone body 12 is shown.

When no abnormality has occurred in any microphone body 12, the speech processing device 100 forms bidirectionality as shown in (b) of FIG. 6 and generates a noise canceling speech signal. Thereby, in the speech processing system 1, a noise canceling speech signal suitable for each of the driver's seat DS side and the passenger seat AS side can be generated and pronounced by the speaker 50. On the other hand, when it is determined that an abnormality has occurred in one microphone body 12, the speech processing device 100 generates a noise canceling speech signal by performing a switching process using the microphone body 12 in which no abnormality has occurred. Thereby, the speech processing system 1 can generate a noise canceling speech signal suitable for at least the driver's seat DS side and cause the speaker 50 to pronounce the noise canceling speech signal. The directionality switching may be performed by, for example, the microphone identifier 111 or the microphone identifier 112, or may be performed by another component (not shown).

In the example shown in FIG. 5, for example, it is possible to similarly form bidirectionality between two microphone bodies 22 of the microphone body 22-1 and the microphone body 22-2 arranged at positions of the left rear seat BS1 and the right rear seat BS2 arranged in the vehicle width direction (the Y-direction in FIG. 5) of the vehicle M. Further, in the example shown in FIG. 5, for example, it is possible to similarly form bidirectionality between two microphone bodies of the microphone body 12-1 and the microphone body 22-1 arranged at positions of the driver's seat DS and the left rear seat BS1 arranged in the vehicle length direction (an X-direction in FIG. 5) of the vehicle M or between two microphone bodies of the microphone body 12-2 and the microphone body 22-2 arranged at positions of the passenger seat AS and the right rear seat BS2. Likewise, from these facts, the speech processing device 100 can perform a switching process so that unidirectionality toward the driver's seat DS side is formed by the microphone body in which no abnormality has occurred and generate at least a noise canceling speech signal suitable for the driver's seat DS side. In particular, because an abnormality is unlikely to occur in the microphone body 12 and the microphone body 22 at the same time in the case where one is the microphone body 12 and the other is the microphone body 22 such as the case where the microphone body 22 is arranged at the driver's seat DS and the microphone body 12 is arranged at the passenger seat AS, a method of switching the microphone body in which no abnormality occurs to unidirectionality and generating a noise canceling speech signal is effectively considered.

In the above description, the case where the speech processing device 100 performs a switching process so that unidirectionality toward the driver's seat DS is formed when it is determined that an abnormality has occurred in any microphone body has been described. However, the vehicle M does not always have an occupant on the passenger seat AS or the rear seat BS. That is, the case where only the driver is in the vehicle M is also taken into consideration. Considering this, the speech processing device 100 may be configured so that directionality of the microphone body is switched in accordance with a situation in which the occupant is in the vehicle M in a state in which the directionality of the microphone body is not switched to unidirectionality when it is determined that an abnormality has occurred in any microphone body. That is, even if no abnormality has occurred in any microphone body, when only the driver is in the vehicle M, the directionality of the microphone body may be switched so that a noise canceling speech signal suitable for the driver's seat DS is generated. In this case, the situation in which the occupant is in the vehicle M may be ascertained, for example, by using information (siting information) output by a siting sensor (not shown) using a pressure sensor provided at the bottom of each seat, a tension sensor attached to a seat belt, or the like or by performing image processing (an occupant recognition process) on an image of the cabin photographed by a cabin camera (not shown) that photographs the cabin.

According to the above-described configuration and control method, in the speech processing system 1, the speech processing device 100 generates a noise canceling speech signal for canceling noise within the cabin at a position where each microphone body is arranged on the basis of a speech signal based on speech collected by the microphone body 12 and the microphone body 22 arranged at positions within the cabin of the vehicle M. Moreover, in the speech processing system 1, the speech processing device 100 generates the noise canceling speech signal by setting a state in which a time difference between the delayed speech signal based on the analog-microphone speech signal and the digital-microphone speech signal collected at the same time point is eliminated. Thereby, in the speech processing system 1, the noise-canceled speech signal to be generated can be made more accurate. In the speech processing system 1, the noise canceling speech signal generated by the speech processing device 100 is pronounced by the corresponding speaker 50. Thereby, in the speech processing system 1, the noise within the cabin at each position can be canceled with higher accuracy by the noise canceling speech signal pronounced by the speaker 50.

Further, when an abnormality has occurred in any microphone body, the speech processing system 1 performs speech signal processing for generating a noise canceling speech signal as in the normal operating state by generating a simulated speech signal obtained by simulating a speech signal based on speech collected by the microphone body in which an abnormality has occurred on the basis of a speech signal based on speech collected by the microphone body in which no abnormality has occurred. That is, in the speech processing system 1, even if an abnormality has occurred in any microphone body, the noise canceling speech signal can be generated without changing the speech signal processing in the noise cancelation processer 162. Thereby, the speech processing system 1 is compatible with various vehicles in a configuration that is the same as the above-described configuration by changing the delay time information or the correction value information stored in the microphone information DB 40 to information consistent with the connection relationship of each vehicle and component.

Moreover, in the speech processing system 1, the microphone body 12 (the analog microphone) having excellent economic efficiency and the microphone body 22 (the digital microphone) which is disadvantageous in terms of economic efficiency but is unlikely to be affected by noise are mixed as the microphone body that collects the speech to generate the noise canceling speech signal. Thus, in the speech processing system 1, it is possible to increase a degree of freedom in selecting, combining, and arranging each microphone body. By configuring the speech processing system 1 in which the analog microphone and the digital microphone are mixed, it is possible to reduce the overall cost of the speech processing system 1 as compared with the case where all the microphone bodies are configured as digital microphones.

According to the above-described embodiment, the speech processing system 1 includes the analog microphone unit 10 including one or more microphone bodies 12 each arranged within a cabin of the vehicle M and configured to output an analog-microphone speech signal; the digital microphone unit 20 including one or more microphone bodies 22 each arranged within the cabin and configured to output a digital speech signal; the DAC 30 configured to convert the digital speech signal into a digital-microphone speech signal; the delay processer 142 configured to delay at least the analog-microphone speech signal on the basis of a delay time period when the DAC 30 converts the digital speech signal collected at the same time point into the digital-microphone speech signal and output the delayed analog-microphone speech signal as a delayed speech signal; and the signal processer 160 (including the noise cancelation processer 162) configured to perform speech signal processing on the basis of the digital-microphone speech signal and the delayed speech signal, whereby speech processing can be performed using each of the analog speech signal (the analog-microphone speech signal) and the digital speech signal in the vehicle M in which the analog microphone and the digital microphone are mixed. Thereby, the vehicle M equipped with the speech processing system 1 can implement an audio space suitable for the occupant in which noise within the cabin such as noise outside of the cabin that has leaked into the cabin is canceled.

The embodiment described above can be represented as follows.

A speech processing system including:

a hardware processor, and a storage device storing a program, wherein the hardware processor reads and executes the program stored in the storage device to:

delay at least a first analog speech signal output by each of one or more analog microphones arrangeable within a cabin on the basis of a delay time period when the digital-to-analog convertor converts a digital speech signal, which is collected at the same time point as the first analog speech signal and output by each of one or more digital microphones arrangeable within the cabin, into a second analog speech signal and output the delayed first analog speech signal as a third analog speech signal; and perform speech signal processing on the basis of the second analog speech signal and the third analog speech signal.

Although modes for carrying out the present invention have been described above using embodiments, the present invention is not limited to the embodiments and various modifications and substitutions can be made without departing from the scope and spirit of the present invention.

What is claimed is:

1. A speech processing system comprising:

one or more analog microphones each arrangeable within a cabin and configured to output a first analog speech signal;

one or more digital microphones each arrangeable within the cabin and configured to output a digital speech signal;

a digital-to-analog convertor configured to convert the digital speech signal into a second analog speech signal; and a speech signal processer including a delay processer, the delay processer being configured to delay at least the first analog speech signal on the basis of a delay time period, the delay processer being configured to output the delayed first analog speech signal as a third analog speech signal, wherein the delay time period is a period when the digital-to-analog convertor converts the digital speech signal into the second analog speech signal, the digital speech signal is a signal collected at the same time point as the first analog speech signal, and the speech signal processer is configured to perform speech signal processing on the basis of the second analog speech signal and the third analog speech signal.

2. The speech processing system according to claim 1, wherein the speech signal processer performs the speech signal processing of causing an audio device arranged within the cabin to pronounce a speech output signal for canceling noise within the cabin on the basis of the second analog speech signal and the third analog speech signal.

3. The speech processing system according to claim 1, wherein the speech signal processer further includes a speech corrector configured to correct the first analog speech signal or the second analog speech signal using a correction value based on information of arrangement positions of the analog microphone and the digital microphone within the cabin or information of a distance between the arrangement positions within the cabin, and wherein the speech corrector outputs a simulated speech signal obtained by correcting the second analog speech signal using the correction value as the third analog speech signal when an abnormality has occurred in the analog microphone.

4. The speech processing system according to claim 1, wherein the speech signal processer further includes a speech corrector configured to correct the first analog speech signal or the second analog speech signal using a correction value based on information of arrangement positions of the analog microphone and the digital microphone within the cabin or information of a distance between the arrangement positions within the cabin, and wherein the speech corrector outputs a simulated speech signal obtained by correcting the first analog speech signal using the correction value as the second analog speech signal when an abnormality has occurred in the digital microphone.

5. The speech processing system according to claim 3, wherein the speech signal processer:

forms bidirectionality in which the analog microphone and the digital microphone are directed toward a driver's seat and a passenger seat within the cabin; and switches directionality to unidirectionality in which the other of the analog microphone and the digital microphone in which an abnormality has not occurred is directed toward the driver's seat when an abnormality has occurred in one of the analog microphone and the digital microphone.

6. A speech processing method comprising:

delaying, by a computer, at least a first analog speech signal on the basis of a delay time period, the first analog speech signal being output by each of one or more analog microphones arrangeable within a cabin the delay time period being a period when a digital-to-analog convertor converts a digital speech signal into a second analog speech signal, the digital speech signal being a signal collected at the same time point as the first analog speech signal, the digital speech signal being output by each of one or more digital microphones arrangeable within the cabin;

outputting the delayed first analog speech signal as a third analog speech signal; and performing, by the computer, speech signal processing on the basis of the second analog speech signal and the third analog speech signal.

* * * * *